US012118854B2

(12) United States Patent
Fong

(10) Patent No.: US 12,118,854 B2
(45) **Date of Patent: *Oct. 15, 2024**

(54) GAMING DEVICES AND GAMING SYSTEMS WITH VARIABLE TRIGGER STATES

(71) Applicant: Aristocrat Technologies Australia Pty Limited, North Ryde (AU)

(72) Inventor: Colin Fong, Penshurst (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,650

(22) Filed: May 12, 2023

(65) Prior Publication Data

US 2023/0282071 A1 Sep. 7, 2023

Related U.S. Application Data

(63) Continuation of application No. 17/352,789, filed on Jun. 21, 2021, now Pat. No. 11,688,243, which is a (Continued)

(30) Foreign Application Priority Data

Jul. 17, 2018 (AU) ................................ 2018206711

(51) Int. Cl.
*G07F 17/32* (2006.01)
*G07F 17/34* (2006.01)

(52) U.S. Cl.
CPC .......... *G07F 17/3267* (2013.01); *G07F 17/34* (2013.01)

(58) Field of Classification Search
None
See application file for complete search history.

(56) References Cited

U.S. PATENT DOCUMENTS 7,547,252 B2 6/2009 Peterson
7,959,504 B2 6/2011 Baumgartner
(Continued)

FOREIGN PATENT DOCUMENTS

AU 2018206711 2/2020

OTHER PUBLICATIONS

Australian Examination Report No. 2 for App. No. AU2020200810, dated Feb. 22, 2022, 3 pages.
(Continued)

*Primary Examiner* — Ronald Laneau
(74) *Attorney, Agent, or Firm* — Brownstein Hyatt Farber Schreck, LLP

(57) ABSTRACT

A gaming system comprises a processor and memory storing a) multiple feature game trigger probability states including a lowest feature game trigger probability state and a highest feature game trigger probability state; b) a current feature game trigger probability state of the multiple feature game trigger states; and c) instructions. When the instructions are executed, they cause the processor to receive a player selection in respect of play of a game with a base game from which a feature game can be triggered, generate a base game outcome for display, evaluate the base game to determine whether to make an award in respect of the base game, and control a probability of the feature game being initiated (e.g., select the current feature game trigger probability state if the player selection has a first characteristic, or the highest feature game probability state if the player selection has a second characteristic).

20 Claims, 9 Drawing Sheets

Related U.S. Application Data continuation of application No. 16/510,654, filed on Jul. 12, 2019, now Pat. No. 11,062,567.

(56) References Cited

U.S. PATENT DOCUMENTS

| | | | | |
|---|---|---|---|---|
| 8,317,595 | B2 | 11/2012 | Joung | |
| 8,591,312 | B2 | 11/2013 | Roukis | |
| 10,535,229 | B2 | 1/2020 | Olive | |
| 2004/0082378 | A1 | 4/2004 | Peterson | |
| 2004/0147306 | A1 | 7/2004 | Randall | |
| 2006/0030391 | A1 | 2/2006 | Casey | |
| 2009/0291744 | A1 | 11/2009 | Chan | |
| 2014/0287814 | A1 | 9/2014 | Berman | |
| 2017/0092041 | A1* | 3/2017 | Kudo | G07F 17/3267 |
| 2019/0051109 | A1 | 2/2019 | Marks | |
| 2020/0027311 | A1* | 1/2020 | Fong | G07F 17/3267 |
| 2020/0051381 | A1* | 2/2020 | Tam | G07F 17/34 |
| 2023/0049641 | A1* | 2/2023 | Meyer | G07F 17/3267 |

OTHER PUBLICATIONS

Australian Examination Report No. 1 issued in App. No. AU2022201305, dated Apr. 15, 2023, 3 pages.

Notice of Allowance dated Mar. 10, 2021 for U.S. Appl. No. 16/510,654 (pp. 1-5).

Australian Examination Report No. 1 for App. No. AU2020200810, dated Feb. 25, 2021, 7 pages.

Office Action dated Jul. 29, 2020 for U.S. Appl. No. 16/510,654 (pp. 1-7).

Office Action (Non-Final Rejection) dated Jan. 10, 2023 for U.S. Appl. No. 17/352,789 (pp. 1-8).

Office Action (Notice of Allowance and Fees Due (PTOL-85)) dated Apr. 5, 2023 for U.S. Appl. No. 17/352,789 (pp. 1-5).

Office Action (Notice of Allowance and Fees Due (PTOL-85)) dated Apr. 14, 2023 for U.S. Appl. No. 17/352,789 (pp. 1-2).

Office Action (Notice of Allowance and Fees Due (PTOL-85)) dated May 26, 2023 for U.S. Appl. No. 17/352,789 (pp. 1-2).

* cited by examiner

300

| | Reel position | Reel 1 (321) | Reel 2 (322) | Reel 3 (323) | Reel 4 (324) | Reel 5 (325) |
|---|---|---|---|---|---|---|
| 301 | 1 | Pic 1 | 10 | Pic 3 | Q | Pic 1 |
| 302 | 2 | Wild | Q | K | A | 10 |
| 303 | 3 | J | K | 10 | 10 | A |
| 304 | 4 | Q | A | Q | Pic 2 | Pic 2 |
| 305 | 5 | 10 | Pic 2 | K | J | A |
| 306 | 6 | A | 9 | Pic 1 | Wild (331) | Q |
| 307 | 7 | Pic 2 | Wild | J | 9 | K |
| 308 | 8 | A | Pic 3 | K | 10 | Pic 2 |
| 309 | 9 | Q | Q | 9 | A | 9 |
| 310 | 10 | K | 10 | Q | Q | Wild |
| 311 | 11 | J (341) | A | 10 | J | 9 |
| 312 | 12 | 10 (342) | Wild | Wild | K | Q |
| 313 | 13 | Pic 3 (343) | K | A | Wild | 10 |
| 314 | 14 | Wild | J | A | Pic 3 | Wild |
| 315 | 15 | 9 | 10 | Wild | Pic 1 | A |

FIG. 3

GAMING DEVICES AND GAMING SYSTEMS WITH VARIABLE TRIGGER STATES

CROSS REFERENCE TO RELATED APPLICATION

This application is a continuation of U.S. patent application Ser. No. 17/352,789, filed Jun. 21, 2021, which is a continuation of U.S. patent application Ser. No. 16/510,654, filed Jul. 12, 2019, now U.S. Pat. No. 11,062,567, the disclosures of which are hereby incorporated by reference. U.S. patent application Ser. No. 16/510,654 claims priority to Australian Patent Application No. 2018206711, filed Jul. 17, 2018, the disclosure of which is hereby incorporated by reference.

FIELD

The present application relates to gaming devices and gaming systems with variable trigger states.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or pay lines) through the matrix indicate the outcome of the game. The display typically highlights winning combinations/outcomes for ready identification by the player. Matching combinations and their corresponding awards are usually shown in a "pay table" which is available to the player for reference. Often, the player may vary his/her wager to include differing numbers of pay lines and/or the amount bet on each line. By varying the wager, the player may sometimes alter the frequency or number of winning combinations, frequency or number of secondary games, and/or the amount awarded.

Typical games use a random number generator ("RNG") to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

In embodiments described herein, the probability of a feature game being triggered by a gaming system is dependent on a feature game trigger probability state. A player selection influences whether a current feature game trigger probability state or a highest feature game trigger probability state applies.

An embodiment provides a gaming system comprising a processor and memory. The memory stores a) a plurality of possible feature game trigger probability states including a lowest feature game trigger probability state and a highest feature game trigger probability state; b) a current feature game trigger probability state of the plurality of feature game trigger states; and c) instructions. When the instructions are executed by the processor, they cause the processor to receive a player selection in respect of play of a game having a base game from which a feature game can be triggered, generate a base game outcome for display, evaluate the base game to determine whether to make an award in respect of the base game, and control a probability of a feature game being initiated based at least in part on the player selection. If the player selection has a first characteristic, the probability of the feature game being initiated corresponds to the current feature game trigger probability state. On the other hand, if the player selection has a second characteristic, the probability of the feature game being initiated corresponds to the highest feature game probability state. When the instructions are executed by the processor, they can also cause the processor to conduct any initiated feature game and make any award resulting from the feature game (e.g., generate a feature game outcome for any initiated feature game, and evaluate the any initiated feature game to determine any award in respect of the any initiated feature game).

Another embodiment provides a gaming device comprising a display, a processor, and memory storing instructions. When the instructions are executed by the processor, they cause the processor to receive, based on player input, a player selection in respect of play of a game having a base game from which a feature game can be triggered. The player selection has a characteristic that indicates a probability of the feature game being initiated to correspond to, from among a plurality of possible feature game trigger probability states, a current feature game trigger probability state or a highest feature game trigger probability state. When the instructions are executed by the processor, they further cause the processor to display a base game outcome, display any award in respect of the base game, display a feature game outcome of a feature game (which has been initiated based at least in part on the probability of the feature game being initiated), and display any award resulting from the feature game.

Another embodiment provides a method of operating a gaming device comprising a display and memory storing a) a plurality of possible feature game trigger probability states including a lowest feature game trigger probability state and a highest feature game trigger probability state; and b) a current feature game trigger probability state of the plurality of feature game trigger states. The method comprises receiving a player selection in respect of play of a game having a base game from which a feature game can be triggered, generating a base game outcome for display on the display, evaluating the base game to determine whether to make an award in respect of the base game, controlling a probability of a feature game being initiated to correspond to the current feature game trigger probability state upon the player selection having a first characteristic, and controlling the probability of a feature game being initiated to correspond to the highest feature game probability state upon the player selection having a second characteristic. The method further comprises conducting any initiated feature game on the display, and making any award resulting from the feature game.

The foregoing and other objects, features, and advantages of the invention will become more apparent from the following detailed description, which proceeds with reference to the accompanying figures.

BRIEF DESCRIPTION OF THE DRAWINGS

FIG. 3 illustrates an example reel strip layout.

DETAILED DESCRIPTION

Figure 1:
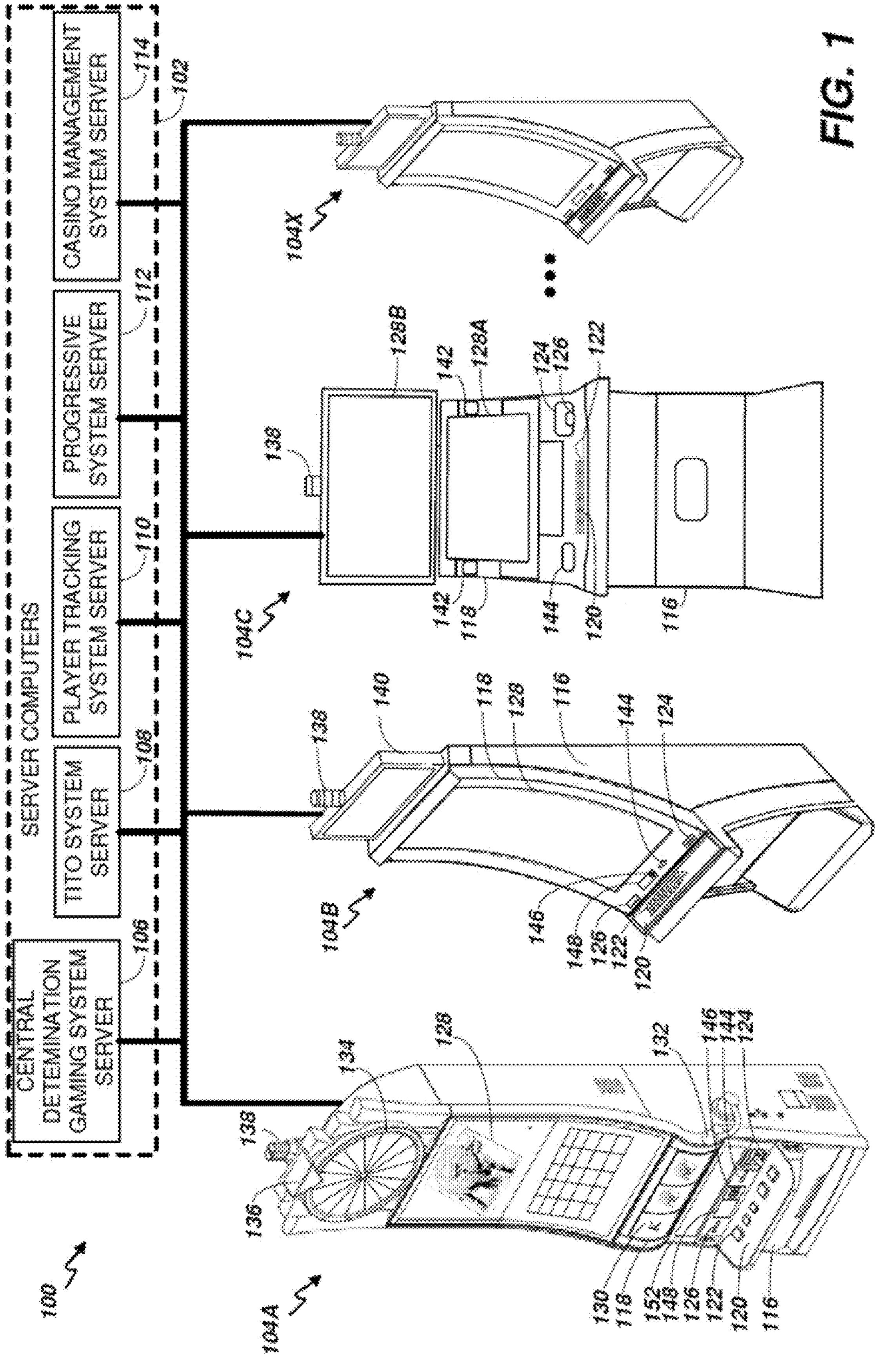
FIG. 1 is an exemplary diagram showing several EGMs networked with various gaming-related servers.

FIG. 1 illustrates several different models of EGMs which may be networked to various gaming related servers. Embodiments described herein can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, one or more embodiments described herein may be practiced on a standalone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out ("TITO") system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically-controlled video monitor.

In some embodiments, the bill validator 124 may also function as a "ticket-in" reader that allows the player to use a casino issued credit ticket to load credits onto the gaming device 104A (e.g., in a cashless ticket system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments, a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display

148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
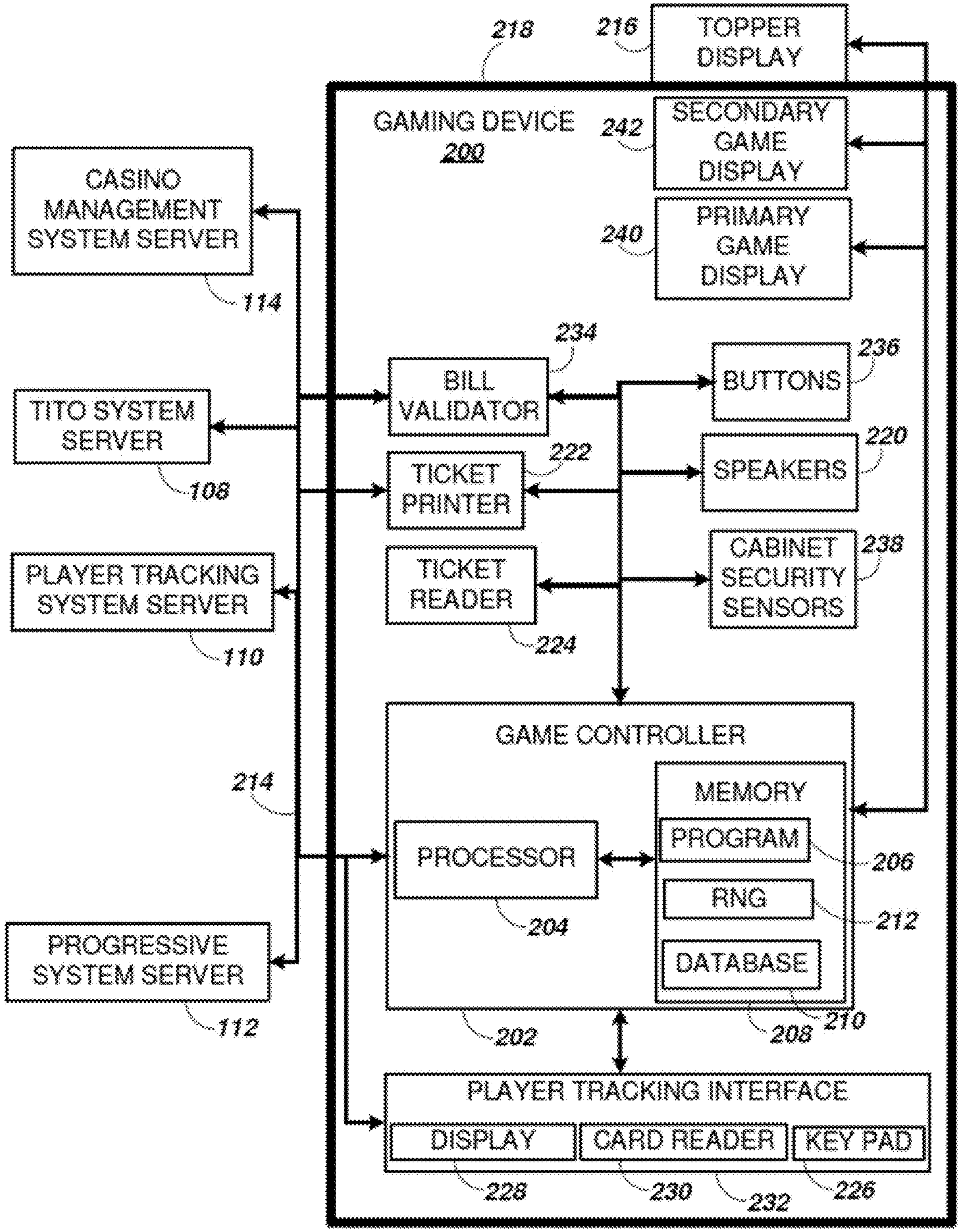
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments described herein necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of pay lines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from memory 208 (e.g., from a read only memory ("ROM")) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data from and/or communicating information to media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special-purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during the course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines. Selecting a number of pay lines to play is only one example of a player selection. In another example employed in the embodiment described below, the player selects a number of reels to play as well as a number of reels to be activated for an additional feature. In still other examples employed in the embodiments described below, the player selects a wager amount (e.g., maximum wager).

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
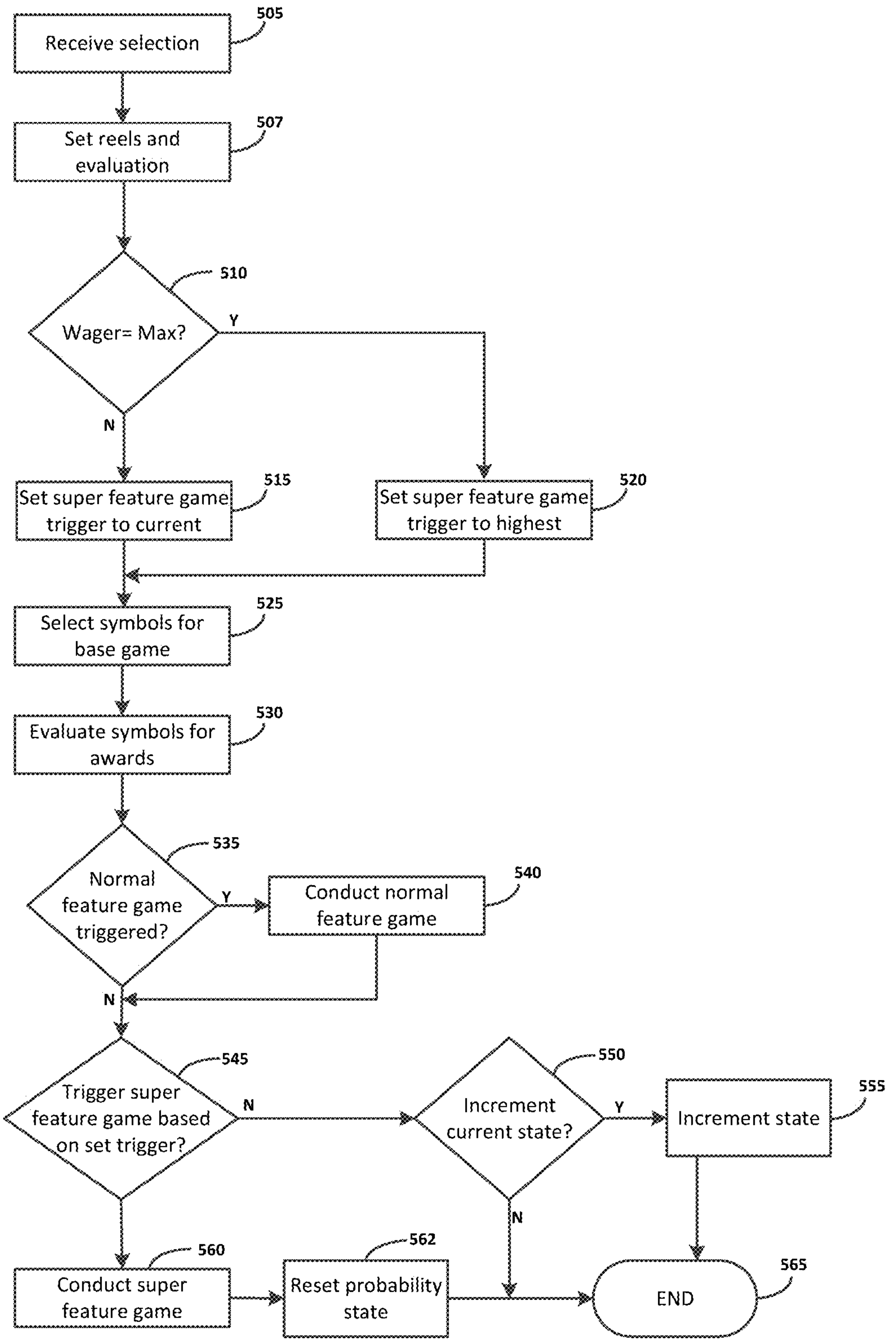
FIG. 5 is a flow chart of a method of operating a gaming machine.

FIG. 5 is a flowchart of a method 500 of operating a gaming device. At step 505, the processor 204 receives a player selection, in respect of play of a game offered by the gaming device, which the player has input via an input device such as buttons 236.

Figure 8:
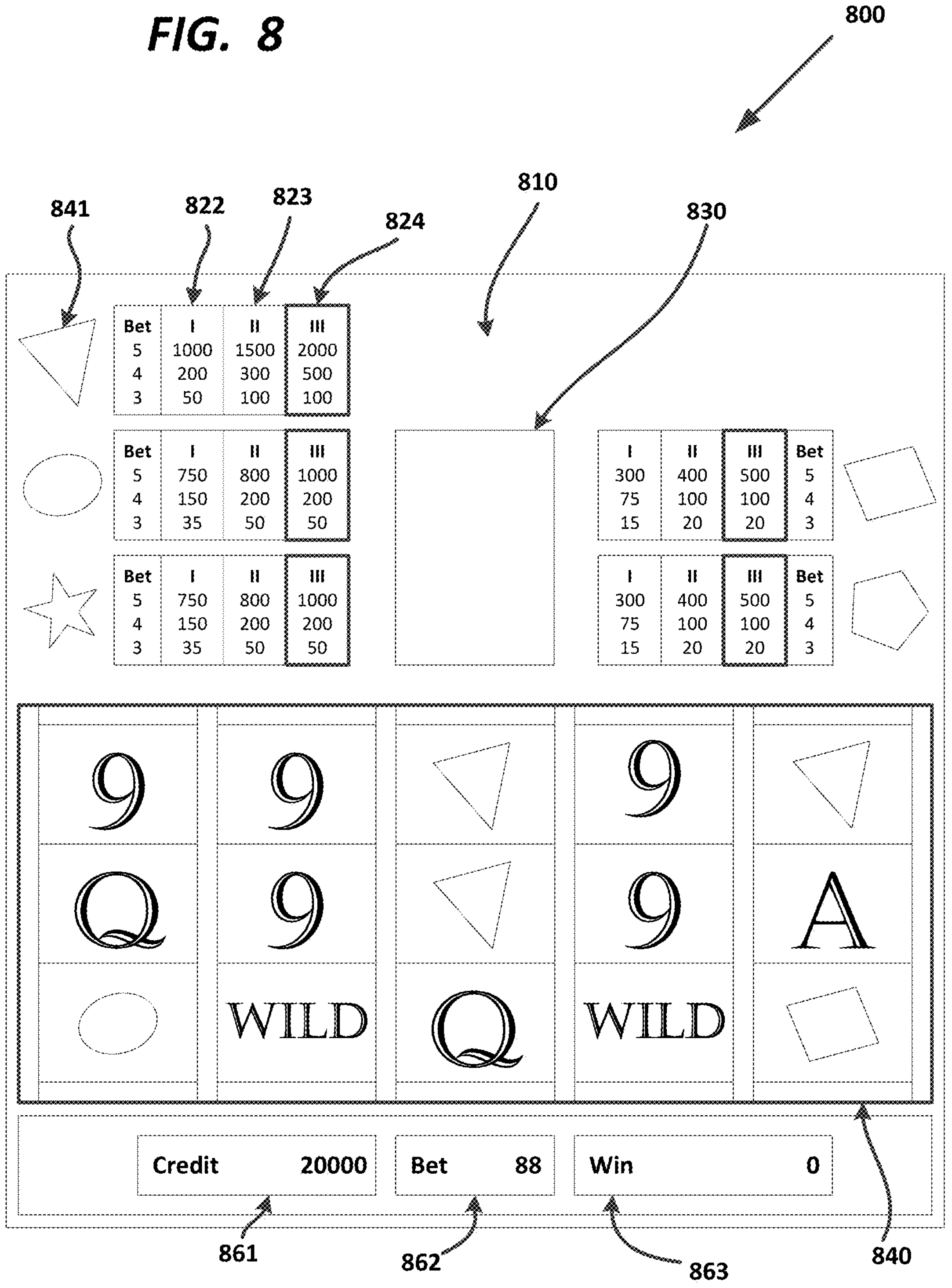
FIG. 8 is a diagram of an example screen display resulting from operating the gaming machine.

In one example, the game is a spinning reel game conducted with five spinning reels, where three symbols are selected for each reel for display in an array of symbol positions such as array 840 in FIG. 8. The player selects from the following options:

| | |
|---|---|
| Play reel 1: | 1 credit. |
| Play reels 1-5, with prize reel 4: | 30 credits. |
| Play reels 1-5, with prize reels 3 and 4: | 40 credits. |
| Play reels 1-5, with prize reels 2, 3 and 4: | 50 credits. |
| Play reels 1-5, with prize reels 2, 3 and 4: | 88 credits. |

A selection to play the first, left-most reel means that each displayed symbol of the reel (in this example, 3 symbols of the reel) can be combined with the symbol in the middle position of each of the other reel to form combinations of symbols that can then be compared to a pay table to determine if they correspond to winning combinations. Thus, for the option of "Play reel 1," the player has 3 ways to win. If the player selects all five reels, as there are five reels and three symbol display positions for each reel, there are $3^5$=243 ways to win.

Selection of prize reels controls which of the reels will have special scatter symbols, which offers a chance to trigger a super feature game described in further detail below based on an operative probability state of the gaming device. Selection of prize reels also sets the pay table evaluation which will apply. In this respect, there are three pay tables, which correspond to whether the player selection is of 1, 2, or 3 prize reels. For example, referring to FIG. 8, the pay table display area 810 shows three pay table options for each symbol that can form a winning combination. In FIG. 8, the third option is highlighted to indicate that the player has selected three prize reels by virtual of placing a bet 862 of 88 credits. For example, for the triangle symbol 841, pay table 824 is active for three prize reels, with different wins applying for 5, 4, or 3 of a kind. Pay tables 822,823 for one and two prize reels are inactive. At step 507, the processor 204 sets the reels and pay table on this basis.

Indicators (not shown) can indicate which, if any, of the prize reels are active.

Additionally, if the player selects the "88 credit", maximum wager option, the operative probability state is set to the highest probability state, such that the chance of the super feature game being triggered is at its highest. Accordingly, at step 510, the processor 204 determines whether the wager is the maximum wager and, if it is not, sets 515 the super feature game trigger probability to a current trigger probability (described further below), or, if it is the maximum wager, sets 520 the super feature game trigger to the highest probability. Thus, the probability of the super feature game being triggered is based not only the number of prize reels, which include special scatter symbols to be evaluated (at step 545) when assessing whether a trigger condition has happened, but also based on characteristics of the wager, which affect the operative probability state to be evaluated (at step 545) in a random determination after the trigger condition has happened. In other examples, the number of reels with trigger symbols may not be dependent on player selections.

After the player selections have been processed, at step 525, the processor selects symbols for a base game. FIG. 3 illustrates an example of a set 300 of five reel strips 321, 322, 323, 324, 325. In the example, each reel strip has fifteen reel strip positions 301-315. Each reel strip position of each reel has a symbol. For example, a "Wild" symbol 331 occupies the sixth reel strip position 306 of the fourth reel 324. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual length of the feature game reel strips would depend on factors such as the number of wild symbols (in general, the more wild symbols there are, the longer the reel strip needs to be to maintain the target RTP), and volatility (in general, the higher the prize value is, the longer the reel strip needs to be to lower the hit rate to maintain the target RTP).

Figure 4:
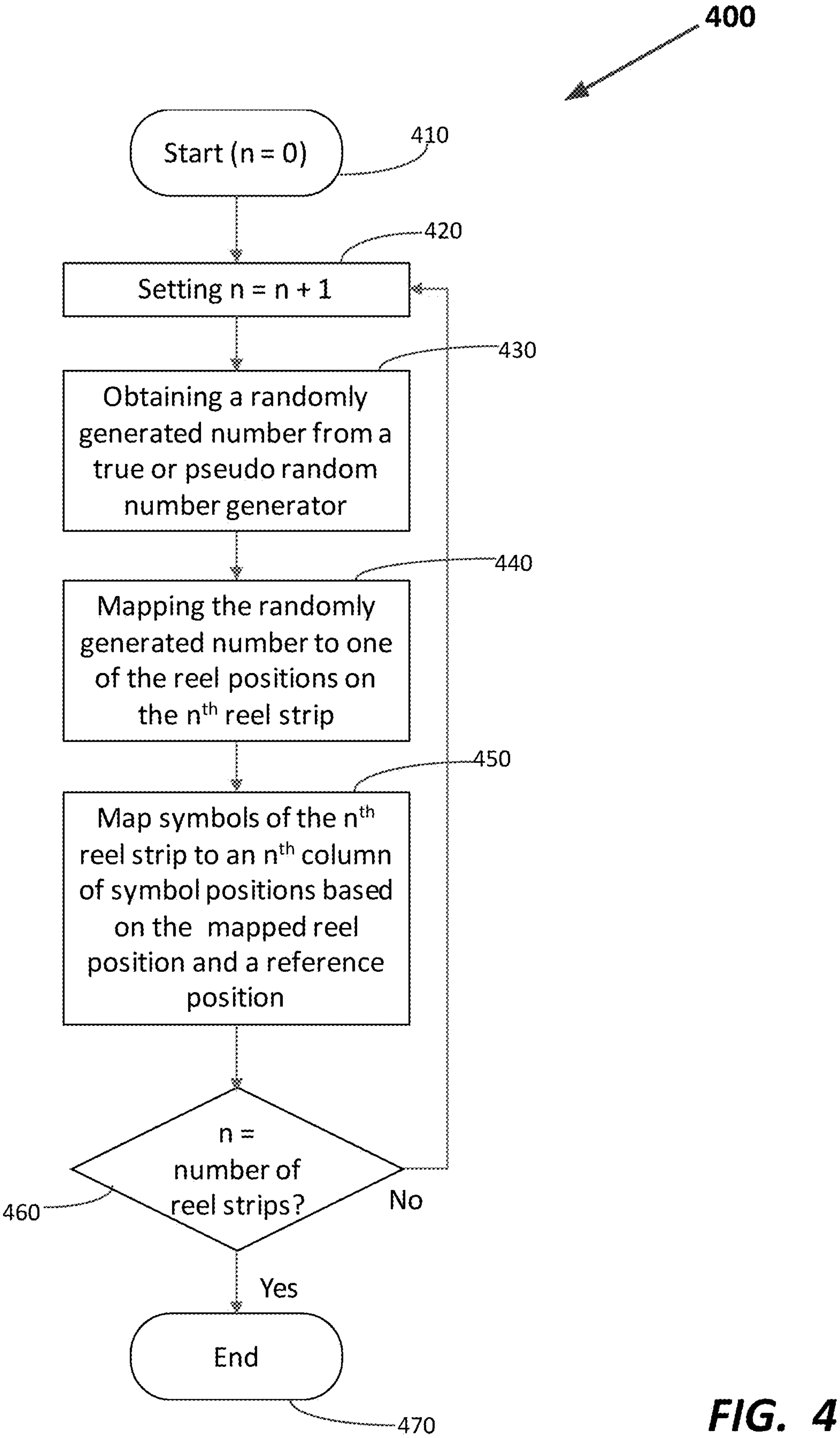
FIG. 4 is a flow chart of a symbol selection method.

FIG. 4 is a flow chart of an example of a method 400 that can be carried out by the processor 204 to select symbols from reel strips at step 525. At step 410, the processor 204 starts the process of selecting symbols with a counter (n) set at zero, as symbols have not yet been selected from any reel strips. At step 420, the processor 204 increments the counter. In the first iteration, the counter is set to 1 to reflect that symbols are to be selected from a first reel strip. At step 430 the processor obtains a randomly generated number from a true or pseudo random number generator 212. At step 440 the processor maps the generated number to one of the reel positions of the $n^{th}$ reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the $n^{th}$ reel strip to an $n^{th}$ column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. Referring to the example reel strips of FIG. 3, if the value returned by the RNG 212 is mapped to reel position 313, then for the first reel strip 321, "Pic3" symbol 343 is mapped to a bottom symbol position, "10" symbol 342 is mapped to a middle symbol position, and "J" symbol 341 is mapped to a top symbol position.

At step 460, the processor 204 determines whether symbols have been selected for all of the reel strips, and, if not, the processor reverts to step 420 and iterates through steps 430, 440 and 450 until it is determined at step 460 that symbols have been selected from all n reel strips and mapped to all n columns of symbol positions, after which the symbol selection process ends 470. Different numbers of symbols may be mapped to different numbers of symbol positions.

After the symbols of all reel strips have been mapped to symbol positions, the processor 204 controls display 240 to display them at the symbol positions.

At step 530, the processor 204 evaluates the symbols based on the pay table that applies, based on the current wager, and adds any award to a win meter in memory 208. The processor 204 also controls the display 240 to display the current value of the win meter 863.

Figure 6:
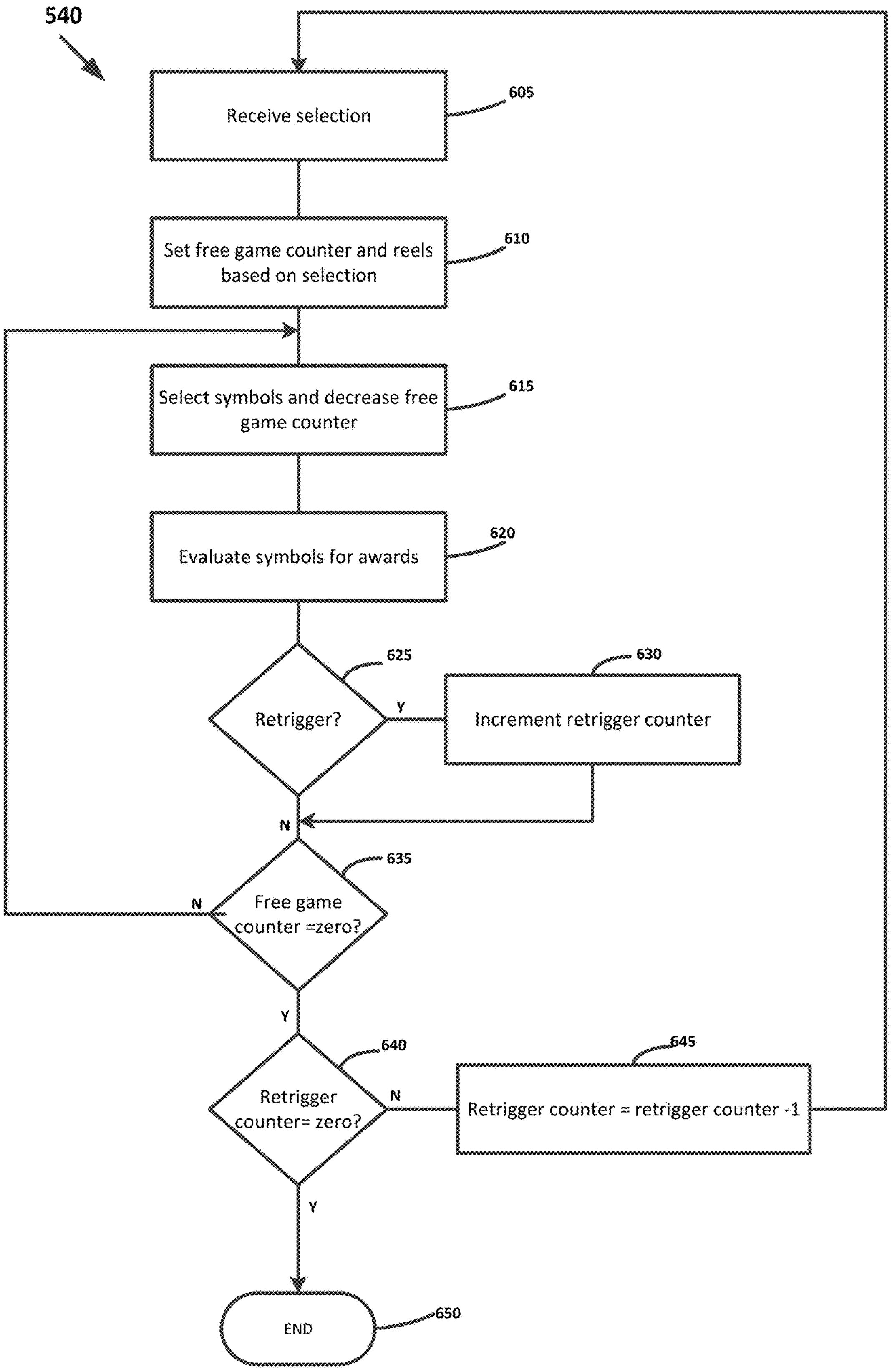
FIG. 6 is a flow chart of a method of operating a gaming machine to conduct a normal feature game.

At step 535, the processor 204 determines whether a trigger condition is met for a normal feature game and, if the trigger condition is met (for example, three normal scatter symbols appear), conducts the normal feature game 540, as shown in more detail in FIG. 6.

Figure 9:
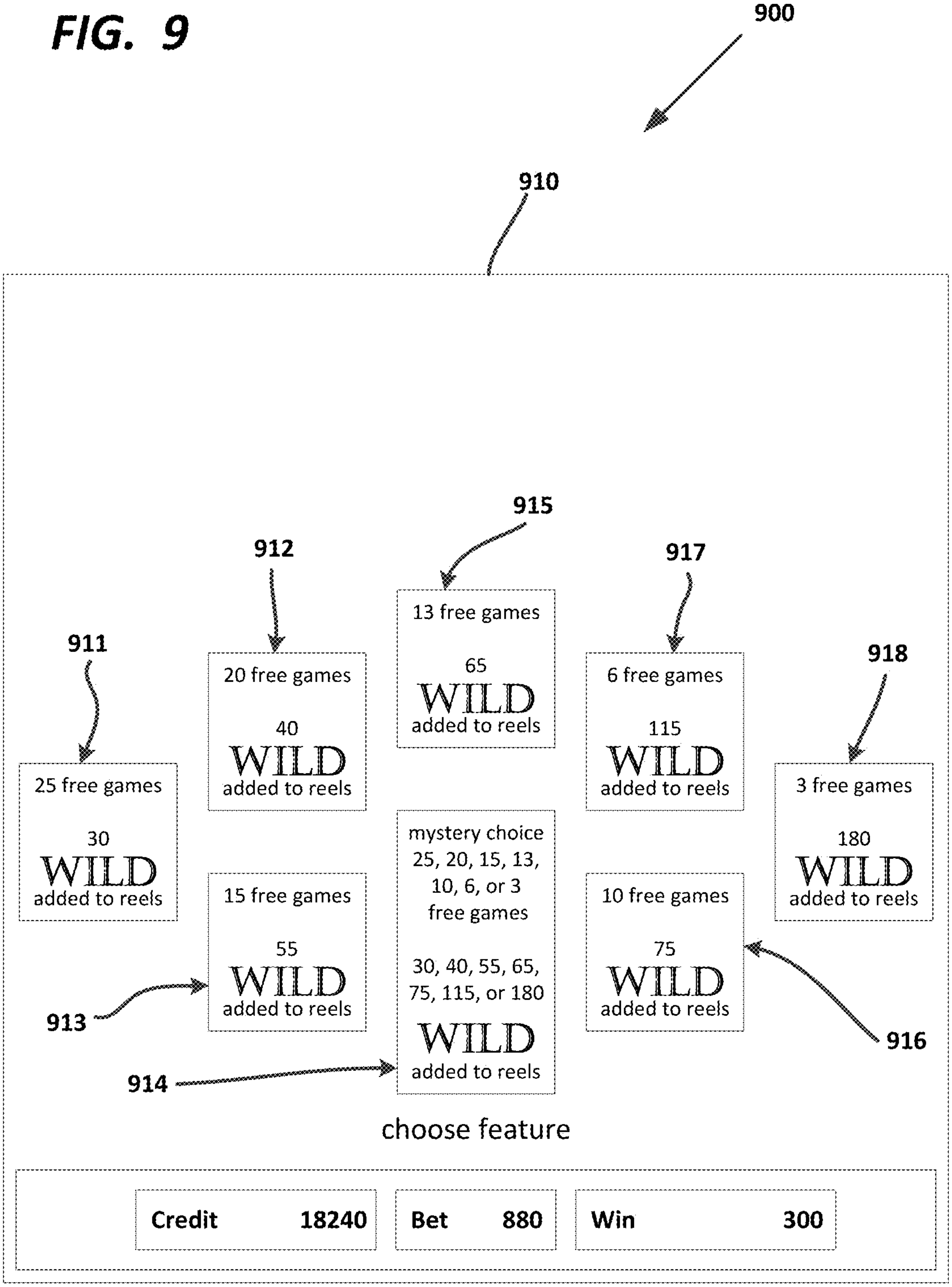
FIG. 9 is a diagram of an example screen display of a player selection screen.

Referring to FIG. 6, at step 605, the processor receives a player selection in respect of the feature game. An example feature game selection screen 900 is shown in FIG. 9. As shown in FIG. 9, the player has up to 8 options to select from:

Option 1 911: 25 free games—30 wild symbols added to the reels.

Option 2 912: 20 free games—40 wild symbols added to the reels.

Option 3 913: 15 free games—55 wild symbols added to the reels.

Option 4 914: Mystery Choice—a combination of number of free games (25, 20, 15, 13, 10 or 6 (or 3, if 88 credits played)) and number of wild symbols added (30, 40, 55, 65, 75 or 115 (or 180, if 88 credits played)) is selected at random (i.e., one of Options 1-3 and 5-8), for example, using RNG 212 and an equal distribution of possible results from the RNG 212 amongst the available options.

Option 5 915: 13 free games—65 wild symbols added to the reels.

Option 6 916: 10 free games—75 wild symbols added to the reels.

Option 7 917: 6 free games—115 wild symbols added to the reels.

Option 8 918: 3 free games—180 wild symbols added to the reels.

In an example, option 8 and the corresponding selection within the mystery choice option 914 are only available if the player wagers 88 credits (the maximum bet).

At step 610, the processor 204 sets the free game counter based on the player selection and sets reels from memory 208 to be used that have the relevant number of wild symbols. In this respect, in this context, a number of wild symbols added to the reels means that the wild symbols are added relative to the number of wild symbols on the reels in the base game. In an example, these symbols are added by retrieving reels from memory 208 that have been pre-configured with the correct number of additional wild symbols.

At step 615, the processor 204 selects symbols for display from the set reels using the technique described in relation to FIG. 4 and controls display 240 to display them at a set of symbol positions such as symbol array 840 as shown in FIG. 8.

At step 620, the processor 204 evaluates the symbols displayed in symbol array 840 based on the applicable pay table.

At step 625, the processor 204 determines whether a retrigger condition has been met. In the example, the retrigger condition is that the symbols at the symbol positions include sufficient trigger symbols (e.g., scatter symbols). If a retrigger condition is met, the processor 204 increments 630 a retrigger counter by one.

At step 635, the processor 204 determines 635 whether the free game counter has reached zero. In this respect, every time the processor 204 selects symbols at step 615, the processor also decrements the free game counter by one.

If the free game counter is determined to be non-zero at step 635, the processor reverts to step 615.

At step 640, the processor determines whether the retrigger counter has reached zero, and, if it has, conduct of the normal feature game ends 650. If the retrigger counter is determined to be non-zero at step 640, the retrigger counter is decremented by one at step 645 before the method reverts to step 605, where the processor 204 controls the display 240 to offer the player a further selection among the available options 911-918 and then receives the selected option.

After conduct 540 of the normal feature game, the method 500 proceeds to determining 545 whether to trigger the super feature game based on the super feature game trigger probability, which has been set at 515 or 520. In this respect, it will be appreciated that in some embodiments a determination as to whether to trigger the super feature game could be carried out prior to conducting the normal feature. In other embodiments, the super feature game may also be triggerable from the normal feature.

In this respect, triggering of the super feature game is contingent on two factors: (1) the appearance of a defined number (e.g., 3) of super feature scatter symbols in the symbols selected in the base game; and (2) the outcome of a random determination based on the set trigger probability. In this respect, as indicated above, the set trigger probability is set (at step 515 or 520) based on a characteristic of the player's selections, in this example, whether or not the player has placed the maximum wager. In this example, there are five possible trigger probability states ranging from a lowest to a highest trigger probability states. In one example, the five probability states correspond to a 10%, 20%, 30%, 40% and 50% chance of the super feature game being triggered. The RNG 212 carries out a random determination at step 545 based on the set probability. From the above, it will be apparent that the player has a highest chance of triggering the super feature game when playing the maximum bet.

The set trigger probability state is represented on display 240 by how full the pot 830 is with gold. In the example of FIG. 8, the full pot indicates that the highest trigger probability state applies, in this case, because the maximum bet has been made.

If the super feature game is not triggered, at step 550, the processor uses the RNG 212 to determine whether to increment the probability state for the next game. The probability can be set at, for example, 50%. If the processor 204 determines to increment the state, the increment is made at step 555 before the game ends 565.

Figure 7:
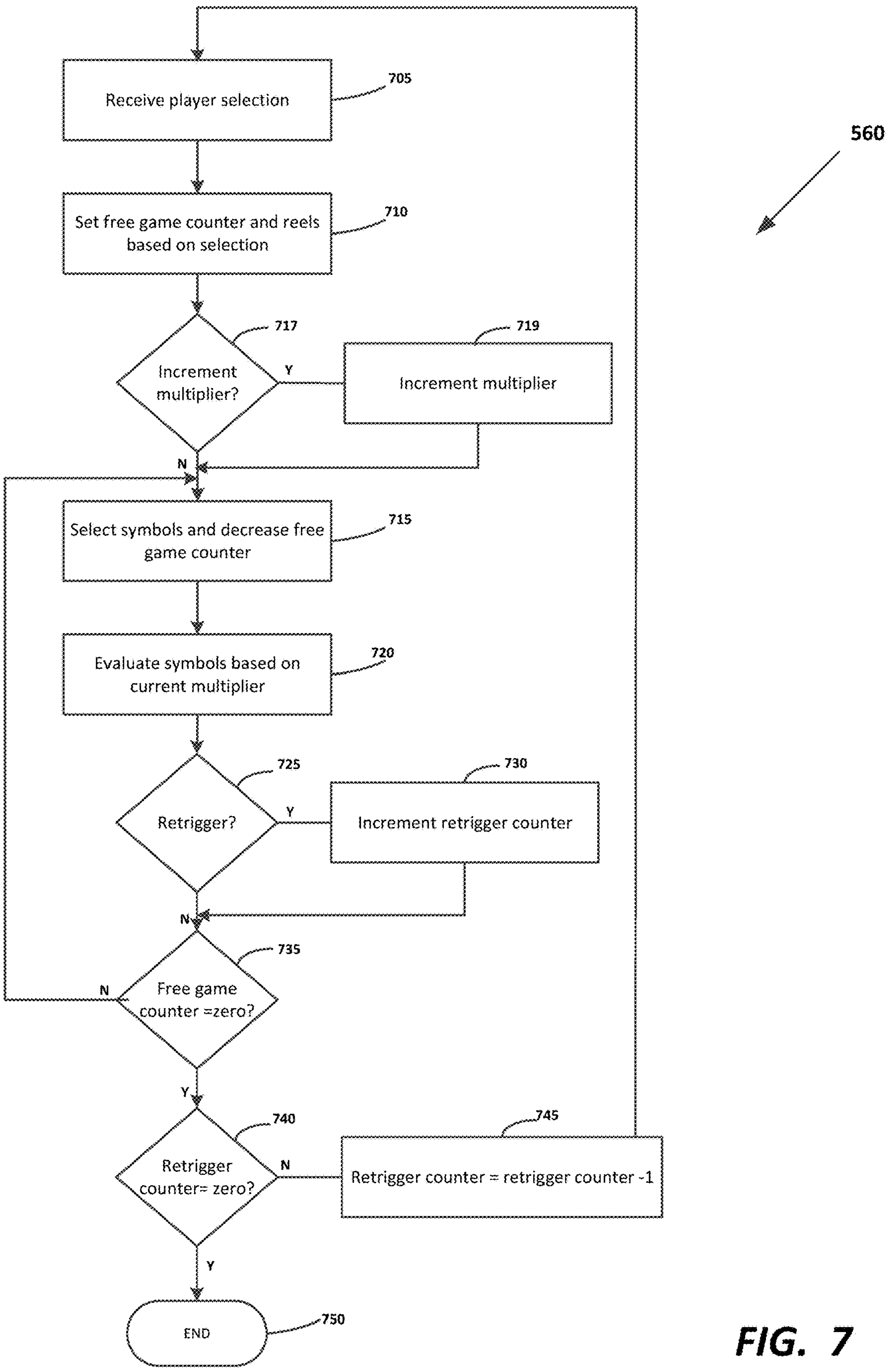
FIG. 7 is a flow chart of a method of operating a gaming machine to conduct a super feature game.

Detail of conduct 560 of the super feature game is shown in FIG. 7. Like the normal feature game, at step 705 a player selection is received from among options 911 to 918 via feature selection screen 910.

At step 710, the processor sets 710 a super feature free games counter and reels based on the player selection in the manner described in relation to step 610 of the normal feature game.

At step 715, the processor 204 selects symbols from the set reels using the techniques described in relation to FIG. 4.

At step 717, there is a chance (e.g., 20%) of a multiplier (initially ×2) being incremented to ×5. Accordingly, at step 717, the processor 204 employs RNG 212 to conduct a random determination as to whether to increment the multiplier. For example, the random determination includes generating a random number and comparing it to a subset of the range of values that can be returned by the RNG 212.

At step 720, the processor evaluates the symbols at the symbol positions based on the applicable pay table and the current multiplier.

At step 725, the processor 204 determines whether a retrigger condition has been met in respect of the super feature game. In the example, the retrigger is that the symbols at the symbol positions includes sufficient special scatter symbols. If a retrigger condition is met, the processor 204 increments 730 a super feature game retrigger counter by one.

At step 735, the processor 204 determines whether the free game counter has reached zero. In this respect, every time the processor 204 selects symbols at step 715, the processor also decrements the free game counter by one.

If the super feature free game counter is determined to be non-zero at step 735, the processor reverts to step 715.

At step 740, the processor determines whether the super feature game retrigger counter has reached zero, and, if it has, conduct of the super feature game ends 750. If the super feature game retrigger counter is determined to be non-zero at step 740, the retrigger counter is decremented by one at step 745 before the method reverts to step 705, where the processor 204 controls the display 240 to offer the player a further selection among the available options 911-918 and then receives the selected option.

After the super feature game is conducted, the probability state is reset 562 to the lowest probability state.

In an alternative example to that described above, rather than the current probability state, the probability of triggering the feature game can be controlled in a different way, for example, by using reels that include a number of super feature game trigger symbols that corresponds to the desired probability.

An example embodiment provides gaming device comprising: a display; a processor; and memory storing a) a plurality of possible feature game trigger probability states including a lowest feature game trigger probability state and a highest feature game trigger probability state; b) a current feature game trigger probability state of the plurality of feature game trigger states; and c) instructions which, when executed by the processor, cause the processor to: receive a player selection in respect of play of a game having a base game from which a feature game can be triggered; generate a base game outcome for display on the display; evaluate the base game to determine whether to make an award in respect of the base game; control a probability of a feature game being initiated to correspond to the current feature game trigger probability state upon the player selection having a first characteristic, and control the probability of a feature game being initiated to correspond to the highest feature game probability state upon the player selection having a second characteristic; conduct any initiated feature game on the display; and make any award resulting from the feature game.

In an example embodiment, when the instructions are executed by the processor, they cause the processor to determine whether to increment the current feature game trigger probability state to a higher feature game trigger probability state of the plurality of possible feature game trigger probability states for a subsequent play of the game. In an example embodiment, when the instructions are executed by the processor, they cause the processor to reset the current trigger probability state to the lowest feature game trigger probability state in response the feature game being triggered.

In an example embodiment, when the instructions are executed by the processor, they cause the processor to control the probability of the feature game being initiated by: a) upon the player selection having the first characteristic, setting an operative feature game trigger probability to a current feature game trigger probability, and, upon the player selection having the second characteristic, setting the operative feature game trigger probability to the highest feature game trigger probability, and b) upon a trigger condition being met in respect of the base game outcome, conducting a random determination based on the operative feature game trigger probability to determine whether to initiate the feature game.

In an example embodiment, when the instructions are executed by the processor, they cause the processor to control the probability of the feature game being initiated by, upon the player selection having the first characteristic, setting the probability of a trigger condition being met in the base game to a current feature game trigger probability, and, upon the player selection having the second characteristic, setting the probability of the trigger condition being met in the base game to the highest feature game trigger probability.

In an example embodiment, when the instructions are executed by the processor, they cause the processor to set the probability of a trigger condition being met by controlling a number of trigger symbols (e.g., scatter symbols) available for selection in a base game. In an example embodiment, when the instructions are executed by the processor, they cause the processor to control the number of trigger symbols available for selection in a base game by setting a set of reels used in the base game.

Another example embodiment provides a method of operating a gaming device comprising a display and memory storing a) a plurality of possible feature game trigger probability states including a lowest feature game trigger probability state and a highest feature game trigger probability state; and b) a current feature game trigger probability state of the plurality of feature game trigger states, the method comprising: receiving a player selection in respect of play of a game having a base game from which a feature game can be triggered; generating a base game outcome for display on the display; evaluating the base game to determine whether to make an award in respect of the base game; controlling a probability of a feature game being initiated to correspond to the current feature game trigger probability state upon the player selection having a first characteristic, and control the probability of a feature game being initiated to correspond to the highest feature game probability state upon the player selection having a second characteristic; conducting any initiated feature game on the display; and making any award resulting from the feature game.

In an example embodiment, the method comprises determining whether to increment the current feature game trigger probability state to a higher feature game trigger probability state of the plurality of possible feature game trigger probability states for a subsequent play of the game. In an example embodiment, the method comprises resetting the current feature game trigger probability state to the lowest feature game trigger probability state in response to the feature game being triggered.

In an example embodiment, the method comprises controlling the probability of the feature game being initiated by: a) upon the player selection having the first characteristic, setting an operative feature game trigger probability to a current feature game trigger probability, and, upon the player selection having the second characteristic, setting the operative feature game trigger probability to the highest feature game trigger probability, and b) upon a trigger condition being met in respect of the base game outcome, conducting a random determination based on the operative feature game trigger probability to determine whether to initiate the feature game.

In an example embodiment, the method comprises controlling the probability of the feature game being initiated by upon the player selection having the first characteristic, setting the probability of a trigger condition being met in the base game to a current feature game trigger probability, and, upon the player selection having the second characteristic, setting the probability of the trigger condition being met in the base game to the highest feature game trigger probability.

In an example embodiment, the method comprises setting the probability of a trigger condition being met by controlling a number of trigger symbols (e.g., scatter symbols) available for selection in a base game. In an example embodiment, the method comprises controlling the number of trigger symbols available for selection in a base game by setting a set of reels used in the base game.

Another example embodiment provides a gaming system comprising: a display; one or more processors; and at least one memory storing a) a plurality of possible feature game trigger probability states including a lowest feature game trigger probability state and a highest feature game trigger probability state; b) a current feature game trigger probability state of the plurality of feature game trigger states; and c) instructions which, when executed by the one or more processors, cause the one or more processors to: receive a player selection in respect of play of a game having a base game from which a feature game can be triggered; generate a base game outcome for display on the display; evaluate the base game to determine whether to make an award in respect of the base game; control a probability of a feature game being initiated to correspond to the current feature game trigger probability state upon the player selection having a first characteristic, and control the probability of a feature game being initiated to correspond to the highest feature game probability state upon the player selection having a second characteristic; conduct any initiated feature game on the display; and make any award resulting from the feature game.

Another example embodiment provides computer program code which, when executed, implements the above method.

Another example embodiment provides a non-transitory computer readable medium comprising the computer program.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A computer-implemented gaming system configured to operate an electronic gaming device, the gaming system comprising:

one or more processors; and memory storing a) a current feature game trigger probability state selected from among multiple possible feature game trigger probability states; and b) instructions which, when executed by the one or more processors, cause the one or more processors to perform operations comprising:

receiving, from user input at an input device, a player selection in respect of play of a game having a base game from which a feature game can be triggered;

based at least in part on the player selection, controlling a probability of the feature game being initiated as part of managing return to player ("RTP") depending on the player selection, wherein the probability of the feature game being initiated corresponds to the current feature game trigger probability state if the player selection has a first characteristic, and wherein the probability of the feature game being initiated corresponds to a feature game trigger probability state of the multiple possible feature game trigger probability states other than the current feature game trigger probability state if the player selection has a second characteristic;

determining whether the feature game is triggered; and based at least in part on whether the feature game is triggered, selectively adjusting the current feature game trigger probability state.

2. The gaming system of claim 1, wherein the input device is a component of the electronic gaming device that includes the one or more processors and the memory.

3. The gaming system of claim 1, wherein the input device is a component of the electronic gaming device that communicates with at least one server that includes the one or more processors or the memory.

4. The gaming system of claim 1, further comprising displaying an award on a display device.

5. The gaming system of claim 4, further comprising transmitting information regarding the any award to the display device for display.

6. The gaming system of claim 5, wherein the display device is a component of an electronic gaming machine that communicates with the one or more processors.

7. The gaming system of claim 1, wherein the selectively adjusting the current feature game trigger probability state includes, in response to the feature game not being triggered, determining, using a random number generator, whether to change the current feature game trigger probability state to a different feature game trigger probability state of the multiple possible feature game trigger probability states for a subsequent play of the game.

8. The gaming system of claim 7, wherein the different feature game trigger probability state is a higher feature game trigger probability state.

9. The gaming system of claim 1, wherein the selectively adjusting the current feature game trigger probability state includes changing the current feature game trigger probability state to a different feature game trigger probability state of the multiple possible feature game trigger probability states in response to the feature game not being triggered.

10. The gaming system of claim 9, wherein the different feature game trigger probability state is a higher feature game trigger probability state.

11. The gaming system of claim 1, wherein the selectively adjusting the current feature game trigger probability state includes resetting the current feature game trigger probability state to a lowest feature game trigger probability state in response to the feature game being triggered.

12. The gaming system of claim 1, wherein the player selection is associated with an amount having a value selected from multiple possible values, and wherein:

the controlling the probability of the feature game being initiated includes, as part of the managing the RTP and in view of the amount associated with the player selection, setting an operative feature game trigger probability, the operative feature game trigger probability being the current feature game trigger probability state if the player selection has the first characteristic, and the operative feature game trigger probability being the feature game trigger probability state of the multiple possible feature game trigger probability states other than the current feature game trigger probability state if the player selection has the second characteristic; and the determining whether the feature game is triggered includes, upon a trigger condition being met in respect of a base game outcome, conducting, using a random number generator, a random determination based on the operative feature game trigger probability to determine whether to initiate the feature game.

13. The gaming system of claim 12, wherein the conducting the random determination includes:

with the random number generator, generating a random number; and based at least in part on the operative feature game trigger probability, using the random number to determine whether to initiate the feature game.

14. The gaming system of claim 1, wherein the operations further comprise:

generating, using a random number generator, a base game outcome for display; and evaluating the base game to determine any award in respect of the base game.

15. A computer-implemented gaming method for operating an electronic gaming device, the method comprising:

storing a current game trigger probability state selected from among multiple possible game trigger probability states;

receiving, based on user input at an input device, a selection for a game, wherein the game comprises a first game from which a second game can be triggered;

based at least in part on the selection, controlling a probability of the second game being initiated as part of managing return to player ("RTP") depending on the selection, wherein the probability of the second game being initiated corresponds to the current game trigger probability state if the selection has a first characteristic, and wherein the probability of the second game being initiated corresponds to a game trigger probability state of the multiple possible game trigger probability states other than the current game trigger probability state if the selection has a second characteristic;

determining whether the second game is triggered; and based at least in part on whether the second game is triggered, selectively adjusting the current game trigger probability state.

16. The method of claim 15, further comprising displaying a graphic indicator that represents the current game trigger probability state.

17. The method of claim 16, wherein the graphic indicator that represents the current game trigger probability state as a progression from a lowest game trigger probability state to a highest game trigger probability state.

18. A computer program product stored in a non-transitory computer readable medium, comprising:

first instructions executable by at least one processor to receive, based on an input at an input device, a selection for a game having a first game from which a second game can be triggered;

second instructions executable by the at least one processor to, based at least in part on the selection, control a probability of the second game being initiated as part of managing return to player ("RTP") depending on the selection, wherein the probability of the second game being initiated corresponds to a current game trigger probability state of multiple game trigger probability states if the selection has a first characteristic, and wherein the probability of the second game being initiated corresponds to a game trigger probability state of the multiple game trigger probability states other than the current game trigger probability state if the selection has a second characteristic;

third instructions executable by the at least one processor to determine whether the second game is triggered; and fourth instructions executable by the at least one processor to, based at least in part on whether the second game is triggered, selectively adjust the current game trigger probability state.

19. The computer program product of claim 18, further comprising fifth instructions executable by the at least one processor to adjust a graphic indicator that represents the current game trigger probability state.

20. The computer program product of claim 18, wherein the first instructions further are executable by the at least one processor to receive the selection in a message from an electronic gaming device, the electronic gaming device comprising the input device.

* * * * *